Nov. 20, 1928.
J. B. BASKERVILLE
1,692,611
RECORDING MECHANISM
Filed Dec. 18, 1924
4 Sheets-Sheet 1
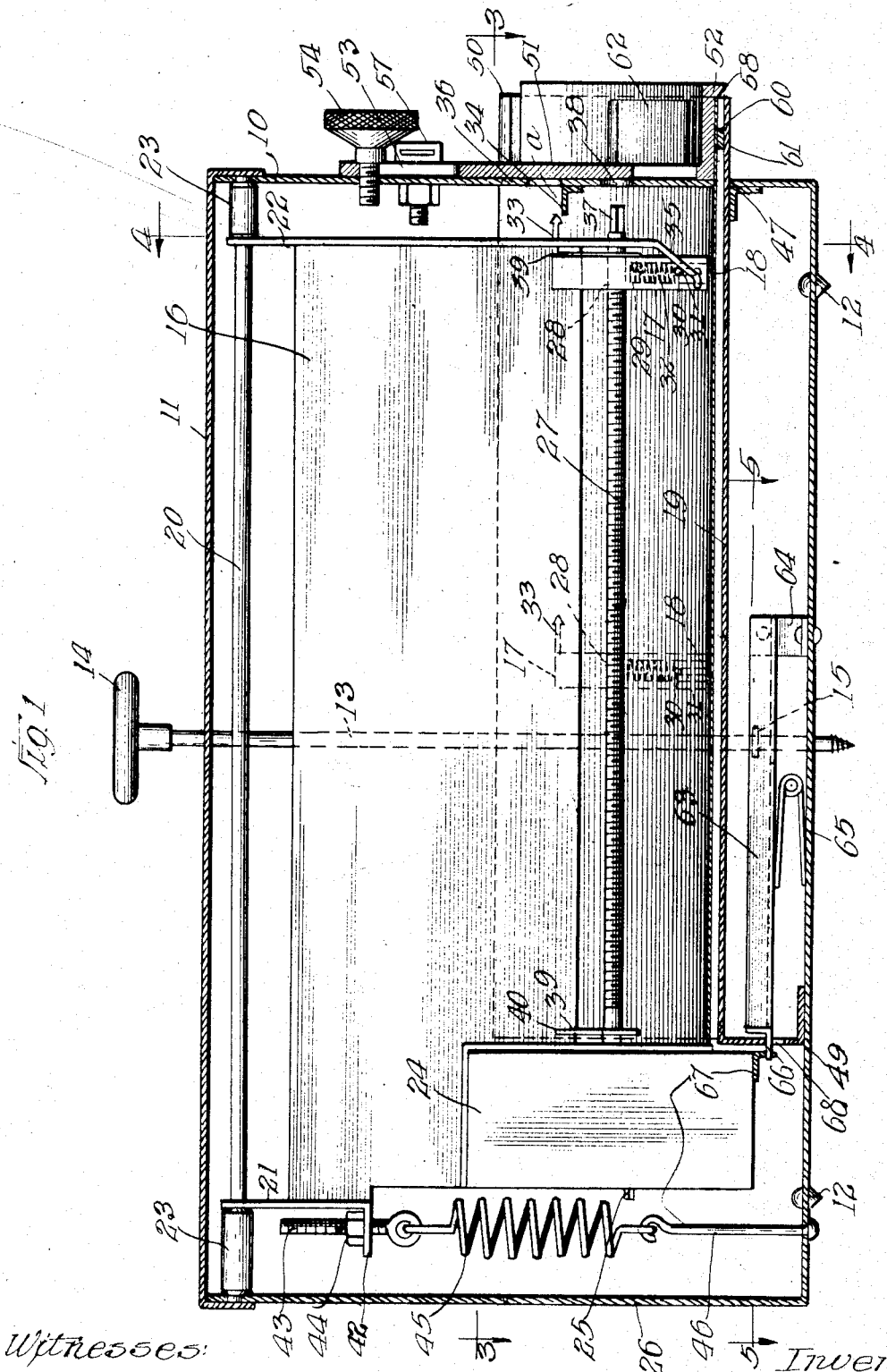

Nov. 20, 1928.
J. B. BASKERVILLE
1,692,611
RECORDING MECHANISM
Filed Dec. 18, 1924  4 Sheets-Sheet 2
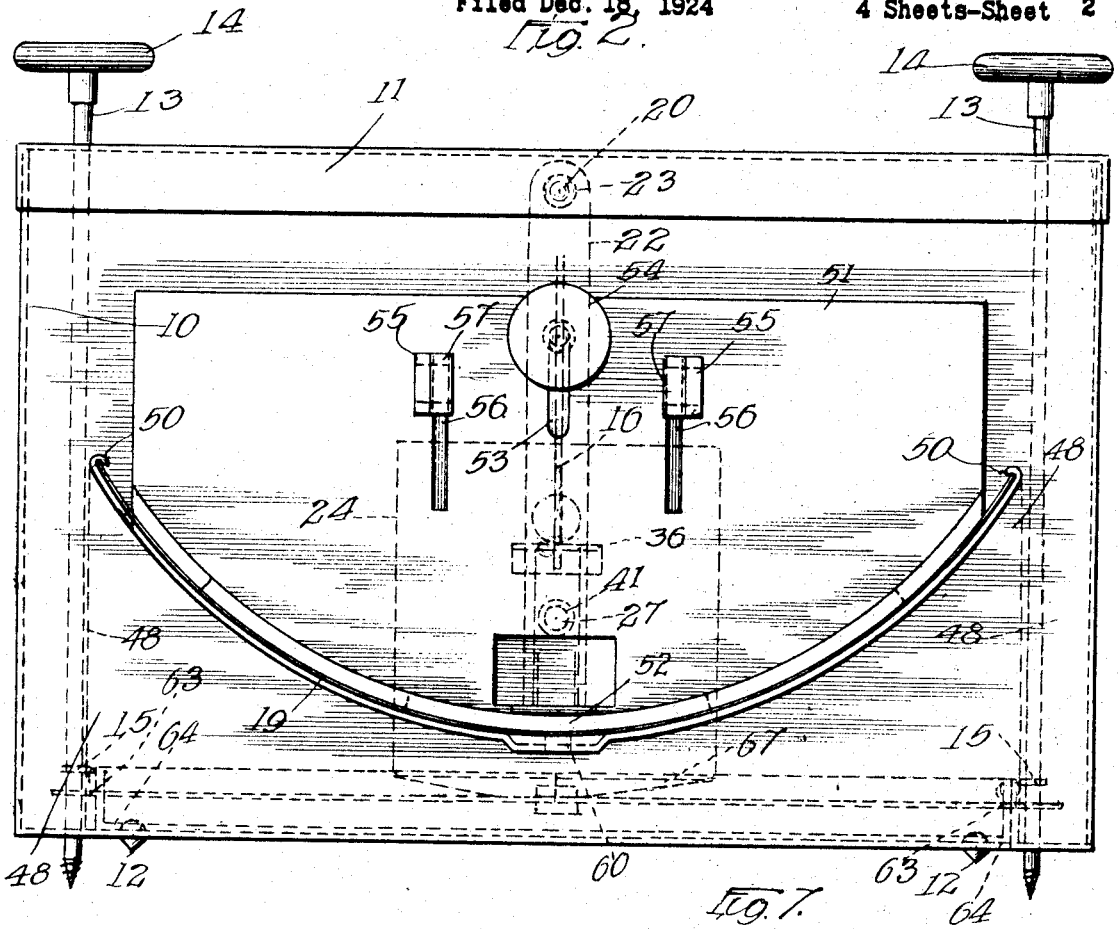
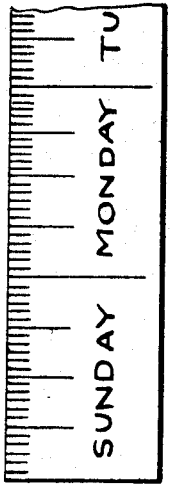
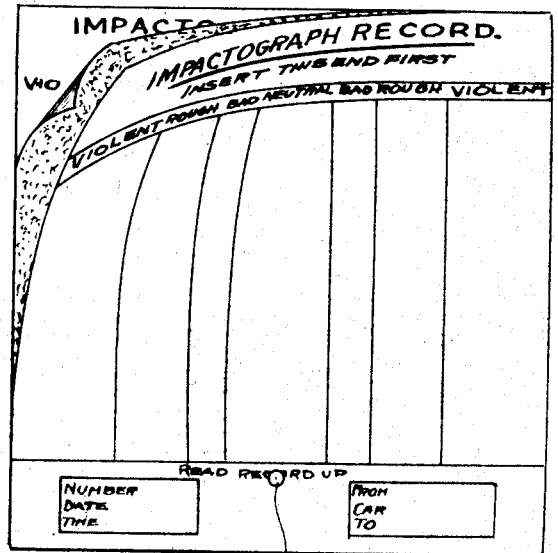

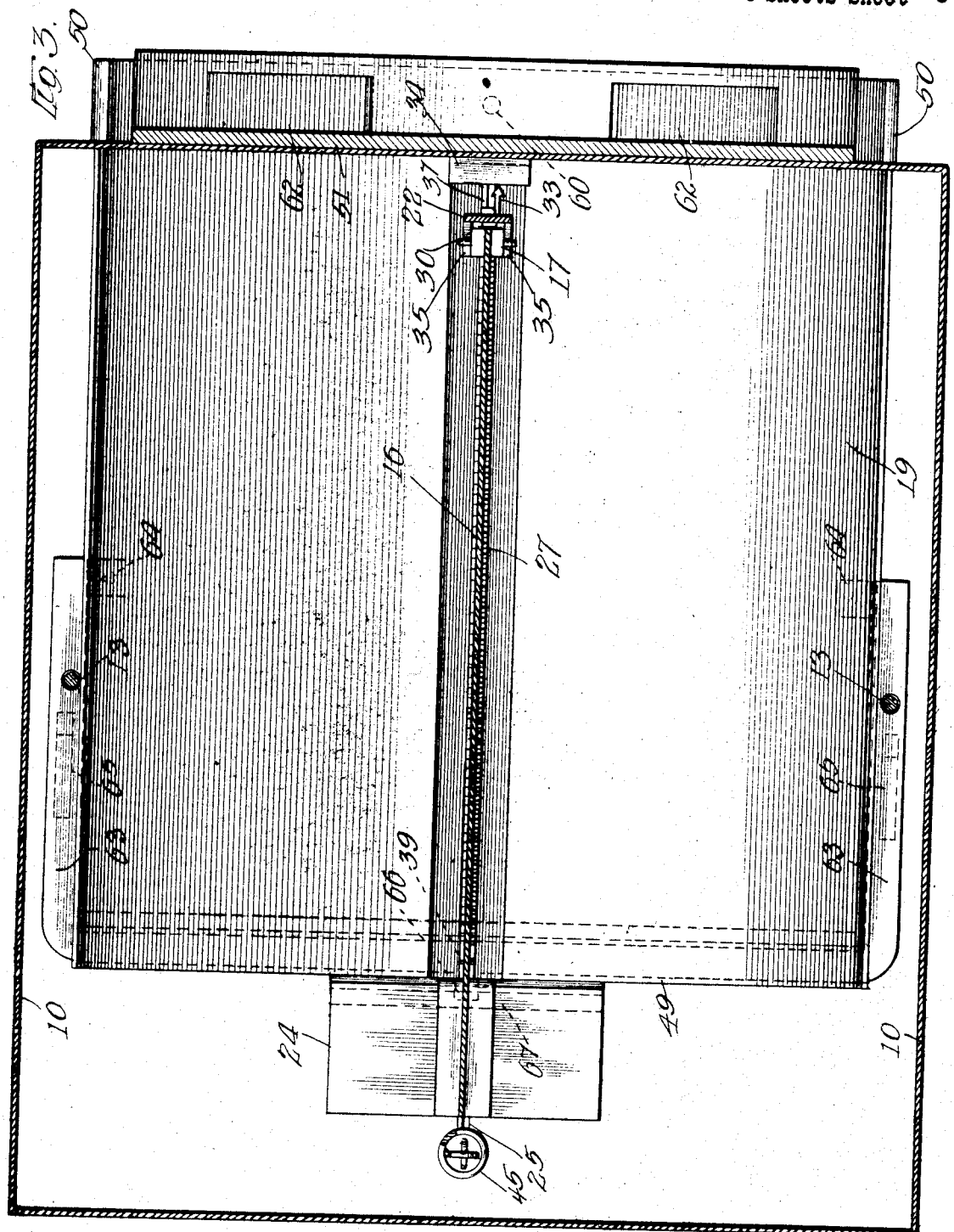

Nov. 20, 1928.  
J. B. BASKERVILLE  
RECORDING MECHANISM  
Filed Dec. 18, 1924  
1,692,611  
4 Sheets-Sheet 4

Witnesses:
Harry W. White
W. T. Kilroy

Inventor:
John B. Baskerville
George D. Haight
By
Attys.

Patented Nov. 20, 1928.

1,692,611

UNITED STATES PATENT OFFICE.

JOHN B. BASKERVILLE, OF ROANOKE, VIRGINIA, ASSIGNOR TO IMPACTOGRAPH CORPORATION, OF ROANOKE, VIRGINIA, A CORPORATION OF VIRGINIA.

RECORDING MECHANISM.

Application filed December 18, 1924. Serial No. 756,668.

This invention relates to improvements in recording mechanisms.

One object of the invention is to provide a mechanism for recording sudden accelerations and decelerations in the movements of vehicles, and more particularly railroad cars.

One object of the invention is to provide a mechanism of the character indicated which will produce a continuous record of the accelerations and decelerations and simultaneously indicate the intensity thereof.

A still further object of the invention is to provide recording mechanism of the character indicated, which is entirely within a closed housing, thereby preventing unauthorized entrance to the housing and tampering with the recording mechanism.

A still further object of the invention is to provide a mechanism of the character indicated, wherein a recording mechanism disposed within a housing cooperates with a record sheet on a support also disposed within the housing, the sheet being clamped in position by a holder adapted to be sealed to prevent unauthorized removal of the record sheet.

A still further object of the invention is to provide means for attaching a recording mechanism of the character indicated to a portion of a car structure, wherein the attaching means is adapted, while being attached and removed from the car, to unlock and lock said recording mechanism, accordingly rendering the same operative and inoperative.

Another object of the invention is to provide means for obtaining accurate information showing the exact service to which the draft gears of a railway car are subjected, in order to determine the relative efficiency of said gears.

Other objects and advantages of the invention will more clearly and fully appear from the description and claims hereinafter following.

Figure 4:
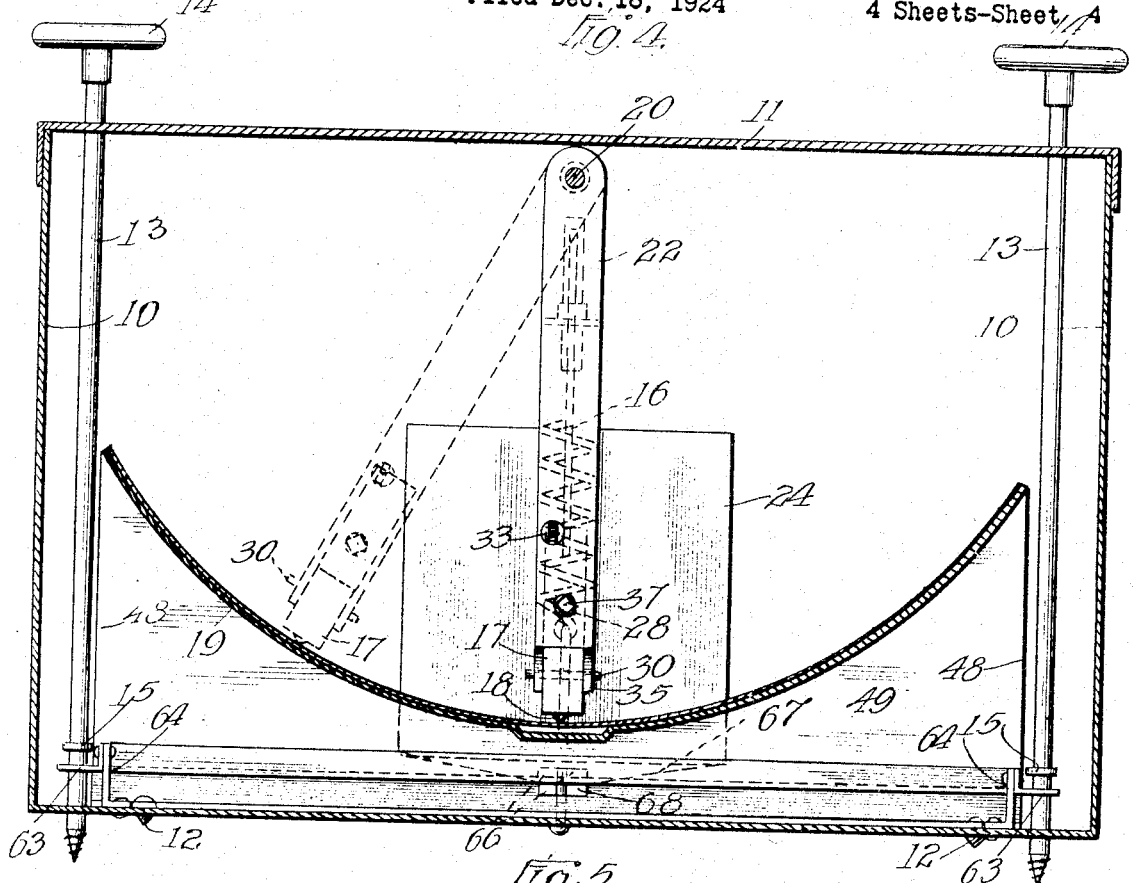
Figure 5:
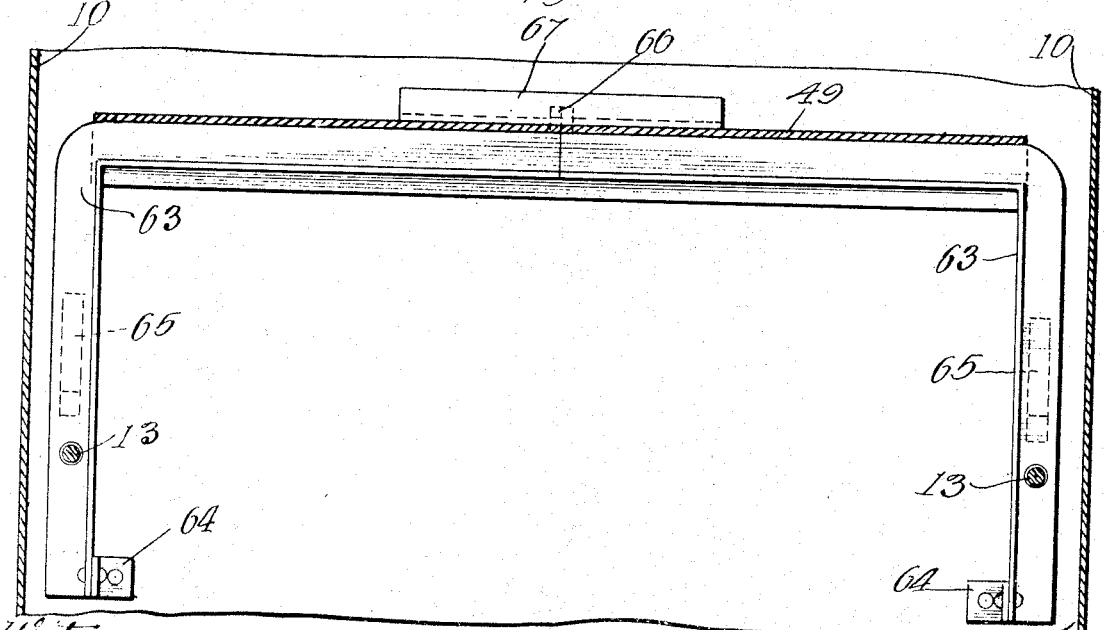

In the drawings, forming a part of this specification, Figure 1 is a longitudinal, vertical, sectional view through my improved mechanism. Figure 2 is a front end elevational view of the device shown in Figure 1. Figure 3 is a horizontal, longitudinal, sectional view corresponding substantially to the line 3—3 of Figure 1. Figure 4 is a transverse, vertical, sectional view corresponding substantially to the line 4—4 of Figure 1. Figure 5 is a horizontal, longitudinal, sectional view, corresponding substantially to the line 5—5 of Figure 1. Figure 6 is a plan view, partly broken away, of a gauging element by which the records of the record sheet are adapted to be read. Figure 7 is a part plan and part perspective view of a set of recording sheets used in connection with my improved device.

In said drawings, 10 indicates a housing of substantially box-like form, within which the recording mechanism proper is disposed. The rectangular box 10 is provided with a lid 11 rigidly secured thereto in any suitable manner so as to prevent removal of the same. In the particular embodiment of the invention herein illustrated, the lid is preferably spot-welded to the box. The bottom wall of the housing is provided with four conical rivet members 12 adapted to cooperate with the floor or similar element of the car to which the housing is to be attached to prevent displacement thereof. The housing 10 is adapted to be secured to and removed from the car at will, two wood screws 13—13 being provided for this purpose. The wood screws 13 extend through the top and bottom walls of the housing and are mounted for rotation therein, each screw being provided with a knob 14 at the upper end thereof for turning the same. Adjacent the lower end of each screw 13 a collar 15 is provided, the purpose of which will be hereinafter described.

The recording mechanism proper, comprises a swinging carrier 16 having a holder 17 slidably mounted thereon, the holder 17 carrying a stylus 18 adapted to record the movements of the carrier on the record sheet, which is disposed on a support 19.

The carrier 16 is swingably mounted in the manner of a pendulum, being supported from a longitudinally disposed shaft 20 having its opposite ends secured in the front and rear walls respectively of the housing 10. A pair of supporting strips 21 and 22 are fixed to the opposite ends of the carrier 16 and are provided with bearing openings in the upper ends thereof by means of which the same are swingably supported from the shaft 20. To prevent longitudinal displacement of the carrier 16 within the housing, spacing spools or thimbles 23—23 are interposed between the strips 21 and 22 and the rear and front walls of the housing respectively.

Rigidly secured to the lower portion of the carrier 16 at the rear end thereof is a clock work 24 of any suitable well-known design, the clock work being provided with a winding stem 25 to which access may be had through an opening 26 in the rear end wall of the housing. The usual minute hand shaft of the clock mechanism is replaced by a longitudinally disposed screw threaded shaft 27 having its forward end journaled in the strip 22. As will be evident, upon reference to Figure 1, the threads on the screw 27 terminate short of the front and rear ends thereof, the purpose of which will be explained hereinafter. The holder 17 is in the form of a relatively heavy block having a screw threaded opening 28 therethrough within which the screw 27 works. The upper end of the block 17 is slotted to accommodate the lower end portion of the carrier plate 22, the slotted portion of the block cooperating with the plate to prevent rotation of the carrier with the screw 27. As will be evident, upon rotation of the screw 27, the holder 17 will be fed either forwardly or backwardly longitudinally of the mechanism, depending upon the direction of rotation of the screw. The marking stylus 18 is mounted for movement within the holder 17, being disposed within a vertical bore 29 of the holder. To limit the outward movement of the stylus with reference to the holder, the former is provided with a relatively long transverse pin 30 projecting from the opposite sides thereof and working in slots 31 in the holder. A spring 32 is interposed between the projecting portions of the pin 30 and the upper end wall of the bore 29, the spring yieldingly holding the stylus projected. An indicator or pointer 33 is rigidly secured to the upper portion of the holder 17 and is adapted to cooperate with a gauge 34 fixed to the front wall of the housing. It will be evident that when the screw 27 is rotated in one direction, the holder 17 will be fed forwardly until it reaches the end of the screw threads and runs off of the same, the screw 27 thereafter rotating freely with reference to the holder 17 and effecting no further longitudinal movement thereof. When the holder is in the full line position shown in Figure 1, a portion of the thread of the screw 27 is still in engagement with the internal threads of the holder and the stylus is in contact with the upper surface of the record sheet. At this time the point of the indicator 33 registers with the inner end of the gauge 34.

Means is provided for raising the stylus from the record sheet so that the sheet may be readily removed. For this purpose the lower end of the strip 22, which extends beyond the lower edge of the carrier plate 16, is slotted vertically to accommodate the holder 17 and is offset rearwardly to provide inclined guides 35 adapted to cooperate with the projecting ends of the pin 30 to automatically retract the stylus and raise the same from the record sheet. When the stylus is thus disengaged from the record sheet, the holder 17 will have been moved to its extreme right-hand position as seen in Figure 1, and the threads will have become disengaged from the internal threads of the holder as hereinbefore pointed out. At this time the indicator point 33 registers with a gauge mark $a$ on the gauge 34, thus giving visual evidence that the stylus is disengaged from the sheet and that the latter may be removed. A window 36 is preferably provided in the front wall of the housing 10 through which the gauge 34 and the gauge point 33 may be viewed.

In order to adjust the holder 17 manually on the screw 27, the front end portion of the screw is provided with an angular key engaging portion 37 by which the same may be rotated, the front wall of the housing being provided with an opening 38 through which the key may be inserted.

Leaf springs 39 are disposed adjacent the opposite ends of the adjusting screw 27, each leaf being rigidly secured to the plate 16. The springs 39 are preferably secured to the plate by having their upper ends forced into slots 40 at the lower edge of the plate. The leaf springs 39 extend downwardly beyond the screw 27 and each is provided with an opening 41 adapted to loosely receive the corresponding end of the screw. The springs 39 are so positioned with reference to the ends of the screw threaded portion of the member 27 that they will yieldingly bear on the outer side of the member 17 when it passes off of the threads, yieldingly urging reengagement of the threads of the member 27 and the member 28 when the former is rotated in the proper direction.

The strip 21 is provided with a horizontal flange 42 at the lower end thereof, the flange 42 being provided with an opening adapted to receive an eye bolt 43, the eye of the bolt 43 being disposed below the flange 42, an adjusting nut 44 engaging the upper surface of the flange 42 being threaded on the bolt. A helical spring 45 is anchored at its upper end to the eye of the bolt 43 and has its lower end secured to a hook 46 which rises upwardly from the bottom wall of the housing 10, the hook 46 being provided with a rivet head to hold the same in position. The opening in the bottom wall of the housing through which the bolt 46 passes, is preferably appreciably larger than the shank of the bolt, so that the latter may assume various angular positions with reference to the bottom wall. The spring 45 serves to retard the swinging movement of the pendulum acting member, and the tension of the spring 45 may be adjusted by the nut 44 to control the amount of retardation of the swinging pendulum member.

The record sheet support 19 is preferably formed of sheet metal and has a concave upper surface corresponding in curvature to the arc described by the stylus in its swinging movement. The sheet metal plate-like member 19 extends through a curved slot 47 in the front wall of the housing and is suitably secured to the bottom wall of the housing by vertically disposed side and end flanges 48 and 49. The extreme ends of the plate-like member 19 are curled over as indicated at 50—50 to provide guides for the opposite edges of the record sheets. The upper surface of the support 19 is depressed centrally longitudinally of the device so that the central portion of the record sheet when on the support may yield a sufficient degree so that the stylus will not bear on the sheet with sufficient pressure to make a mark. This depression corresponds to the neutral zone of the record sheet as shown in Figure 7.

A clamping member 51 is detachably secured to the outer surface of the front wall of the housing 10, the clamping member being provided with a forwardly extending curved flange 52 at the lower end thereof adapted to engage over the projecting end portion of the plate 19. The clamping member is preferably mounted for sliding movement on the front wall of the housing, the same being slotted as indicated at 53, to receive the stem of a thumb screw 54 threaded into said front wall. The clamping member 51 is also provided with a pair of rigid seal receiving lugs 55 disposed at opposite sides thereof. Adjacent each lug 55 a vertical slot 56 is provided in the clamping member, each slot being adapted to slidingly accommodate a seal receiving lug 57 rigid with the box 10 and adapted to be properly registered with the corresponding lug 55 when the plate is in its lowermost position, to prevent unauthorized removal of the plate.

The sheets on which the record is made are most clearly shown in Figure 7, and two of such sheets are preferably placed on the support at one time, a carbon sheet being interposed between the two. The stylus 18 is preferably of hard metal, thereby avoiding the necessity for renewal of the marking point. As the stylus traces the oscillations of the pendulum member on the record sheet, the same will be recorded on the lower sheet by means of the interposed carbon. They may also be recorded simultaneously on the reverse side of the upper sheet by utilizing a double coated carbon sheet. To prevent removal of the record sheets when placed on the support, the clamping member 51 has the lower flange thereof provided with a rib 58 overhanging the outer edge of the plate 19.

Each record sheet is preferably provided with an opening 59 by which the same may be properly registered in the recording mechanism. To this end the flange 52 of the clamp has a downwardly projecting boss 60 adapted to extend through the openings 59 and engage within an opening 61 in the outer end of the plate 19. Upon reference to Figure 7, it will be noted that the lower end of the record sheet is provided with two spaces wherein certain information may be written or printed. To make these spaces accessible, when the sheets are clamped in place and the clamping means has been sealed, the lower flange 12 of the clamping member is provided with a pair of openings 62 adapted to register with said spaces.

A U-shaped member 63 of angular cross-section is pivotally supported on angular brackets 64 secured to the bottom wall of the housing. A spring 65, having two leaves, one of which is suitably secured to the bottom wall of the housing, is associated with each arm of the U member. The connecting arm of the U member is provided with a projecting lip 66 adapted to cooperate with a notched bracket 67 rigidly secured to the bottom of the clock casing to maintain the swinging elements in fixed, neutral position. As clearly shown in Figure 1, the transverse wall of the support 19 is provided with a relatively large opening 68 adapted to accommodate the projecting lip 66. The locking mechanism comprising the U member 63 is adapted to be automatically displaced when the housing is attached to a car, the collars 15 of the wood screws 13 coming into engagement with the horizontal flanges of the U members, thereby depressing the same. It will also be obvious that when the housing is detached from the car, turning of the wood screws in the opposite direction will disengage the collars 15 from the U member, permitting the springs 65 to force the lip 66 in locking engagement with the bracket 67.

The apparatus is used as follows: When it is desired to make a record, the apparatus is placed in the car or other vehicle and so arranged that the swinging movement of the pendulum will be lengthwise of the rails on which the car travels. In attaching the housing, the wood screws 13 are screwed into the floor, bringing the collars 15 in engagement with the U locking member and disengaging the same from the pendulum elements whereupon the latter are free to swing. Assuming that the car is in motion and the holder which carries the stylus is in the full line position shown in Figure 1, rotation of the screw 27 in the proper direction will feed the holder 28 lengthwise of the record sheets, which have previously been placed on the support 19. This operation continues until the holder 28 reaches the rear end of the screw threads of the member 27 and passes off of the threads. Further rotation of the screws thereafter does not affect any movement of the holder and stylus. The shocks due to buffing and draft jolts while the train is being started or stopped and while in motion, are transmitted to the pendulum elements, the swinging movement of which will cause the stylus to record the shocks on the record sheet. The parts are preferably so proportioned that the threads on the screw 27 will feed the holder and stylus forward one inch for each twenty four hours. In other words, the stylus will move a distance longitudinally of the record sheet equal to one twenty-fourth of an inch during each hour. It will be evident that the proportions may be varied so that a greater or lesser longitudinal distance may be traversed during each hour.

To remove the record sheet, the clamp 51 is raised out of contact with the projecting outer end of the sheet, the thumb screw 54 being first loosened and the car seals removed from the sealing lugs 55 and 57. When the clamping member has been raised to the proper height to uncover the opening 38, the winding key is engaged with the square end of the screw and the latter is rotated in the proper direction to return the holder and stylus to the extreme limit of forward movement, whereupon the stylus will be disengaged from the sheet as hereinbefore described, and the record sheet may be readily removed.

In order to make a proper reading of the shocks recorded on the record sheet, a measuring device in the form of a scale as shown in Figure 6 is preferably used. The scale is of substantially the same length as the record sheet and is marked with divisions, each division representing one day of the week. Each division representing a day is preferably divided into 24 subdivisions representing the hours of the day. As will be evident, when the gauge thus provided is held alongside of the record sheet, it can be accurately ascertained at what time of the day and on what day a certain excessive shock was recorded.

From the preceding description, it will be evident that I have provided a recording device which provides means for accurately indicating the time a certain shock takes place and the extent of severity of the shock, thereby providing permanent evidence, in the form of a record sheet, of rough handling of freight in transit so that the blame therefor may be placed upon the individual responsible.

While I have herein shown and described what I now consider the preferred manner of carrying out my invention, the same is merely illustrative and I contemplate all changes and modifications that come within the scope of the claims appended hereto.

What I claim is:

1. In a recording mechanism, the combination with a support for a record sheet; of a swingable member cooperating with said support for movement transversely thereto; and means for progressively feeding said member lengthwise of said support.

2. In a recording mechanism, the combination with a support; of a mechanism swingable transversely of the support, said mechanism including a marking element mounted to travel lengthwise of the support and swing relatively thereto; and means for effecting progressive movement of said element lengthwise of said support.

3. In a recording mechanism, the combination with a record sheet support; of a stylus movable longitudinally and transversely of said support to record shocks on the record sheet, said support being depressed centrally to prevent marking engagement of the stylus with that portion of the sheet which overhangs the centrally depressed portion of the support.

4. In a recording mechanism, the combination with a support adapted to accommodate a record sheet; of a swingable carrier above said support; a stylus movable longitudinally on said carrier, operating means for causing said stylus to move on said carrier; and means for automatically disengaging said operating means when said stylus has traveled a predetermined distance longitudinally of said support.

5. In a recording mechanism having a movable marking element supported in a housing, yielding means for latching said element against movement, and a rod having means to disengage the latch when the rod is operated to fasten the housing to a car.

6. Recording mechanism for railway cars including a record sheet holder mounted in the car and equipped with adjacent marking means, means for anchoring the holder in the car and being in connection with the marker to permit the latter to function only when the said anchoring means is engaged with the car.

7. Recording mechanism including a record sheet carrier, and a sheet marker engageable with the sheet to mark the latter only when the marker and sheet contact at a point beyond the center of the sheet.

8. Recording mechanism including a record sheet carrier, a sheet marker for impingement with the sheet, means to hold the marker in an inoperative position, and anchoring means to hold the carrier in a predetermined position on a support, said anchoring means automatically releasing the marker holding means to permit operation of the marker.

In witness that I claim the foregoing I have hereunto subscribed my name this 9th day of December, 1924.

JOHN B. BASKERVILLE.